United States Patent [19]

Wunning

[11] Patent Number: 4,878,839
[45] Date of Patent: Nov. 7, 1989

[54] NON-POLLUTING HOT GAS GENERATING SYSTEM

[75] Inventor: Joachim Wunning, Leonberg, Fed. Rep. of Germany

[73] Assignee: WS Wärmeprozesstechnik GmbH, Rennigen, Fed. Rep. of Germany

[21] Appl. No.: 234,799

[22] Filed: Aug. 22, 1988

[30] Foreign Application Priority Data

Sep. 8, 1987 [DE] Fed. Rep. of Germany ....... 3729971

[51] Int. Cl.$^4$ .............................................. F26B 5/00
[52] U.S. Cl. ......................................... 432/72; 34/35; 432/8; 110/211
[58] Field of Search .................... 432/59, 72, 8; 34/35; 110/211, 214

[56] References Cited

U.S. PATENT DOCUMENTS

| 2,743,529 | 5/1956 | Hayes ..................................... 34/35 |
| 2,750,680 | 6/1956 | Houdry et al. ......................... 34/35 |
| 2,795,054 | 6/1957 | Bowen, III ............................ 432/8 |
| 3,917,444 | 11/1975 | Carthew ................................ 34/35 |
| 3,942,264 | 3/1976 | Zenkner ................................ 34/35 |
| 4,132,007 | 1/1979 | Voorheis ................................ 34/35 |
| 4,771,707 | 9/1988 | Robson et al. ........................ 432/72 |

FOREIGN PATENT DOCUMENTS 3031935 4/1981 Fed. Rep. of Germany .
3415914 11/1984 Fed. Rep. of Germany .
1404286 8/1975 United Kingdom .

OTHER PUBLICATIONS

"Industrie Anzeiger", (Industrial Gazette), Jan. 30, 1980.
"Gaswarme Interantional", (Gas Heat International) (1984, No. 9).
"VDI Richtlinie 2442", (Society of German Engineers Guideline 2442) Jun., 1987.

Primary Examiner—Henry C. Yuen
Attorney, Agent, or Firm—Frishauf, Holtz, Goodman & Woodward

[57] ABSTRACT

To provide for energy-efficient. non-polluting heat treatment of workpieces (W) which, during heat treatment, emit oxidizable or combustible substances, hot gases are generated in a hot gas generating chamber (2) by a jet burner (5) emitting a flame jet. The hot gas generating chamber (2) is connected through a hot gas outlet (7) with a processing chamber retaining the workpieces, and a recirculating inlet (8) to receive the gases from the processing chamber, after they have been contaminated or received polluting combustible components. The hot gas generating chamber is, additionally, in communication through a duct or gap (4) with an after-burner chamber (3). The process is so controlled that the temperature in the after-burner chamber is maintained sufficiently high to provide for complete combustion of any oxidizable components, and the volume of the after-burner chamber, including the gas passed thereto, is so controlled that a dwell time of the gases therein will obtain which is sufficiently long to provide for said complete combustion. Typical dwell times are 1–2 seconds. A closed gas circulating loop (9) between the hot gas generating chamber (2) and the processing chamber (1) is established, the throughput to which can be controlled, for example by a throttling arrangement (13, 130), based on sensed temperature by temperature sensors (12, 15) which then control the throughput of hot gases in the closed loop and the fuel and air supply to the burner.

24 Claims, 3 Drawing Sheets

NON-POLLUTING HOT GAS GENERATING SYSTEM

REFERENCE TO RELATED PUBLICATIONS

"Industrie Anzeiger" ("Industrial Gazette"), 102nd year, No. 8 of Jan. 30, 1980, article by T.H. Zimmer "Energiesparen durch thermische Nachverbrennung" ("Saving Energy by Thermal After-Burning");

"Gaswärme International" ("Gas Heat International"), 33rd year, (1984), No. 9, article by H.B. Ricke "Thermische Nach-verbrennung mit Erdgasbeheizung an Härteanlagen" ("Thermal After-Burning of Natural Gas Heated Hardening Plants");

"VDI Richtlinie 2442" ("Society of German Engineers Guideline 2442"), Jun. 1987, article entitled "Abgasreinigung durch thermische Verbrennung" ("Exhaust Gas Cleaning by Thermal Combustion").

German Patent 34 22 229.

The present invention relates to pollution control of hot gas generating systems by using after-burning so that the finally emitted exhaust gases will be clean and not contain any polluting components or matter.

BACKGROUND

Many industrial processes and plants and systems require high-temperature treatment during which undesired gases, vapors or particles are emitted which include organic matter. Such gases, vapors or particles can be removed by filters, in scrubbers, or by catalytic or thermal after-burning; in after-burner arrangements they can be rendered harmless, partially or completely. Such processes arise, for example, in drying or impregnating plants, upon handling or manufacturing tar and asphalt, in the production of feed, in the operation of industrial furnaces, for example parts of hardening or tempering or annealing furnace, or in sintering furnaces.

Some of the processes emit, upon thermal treatment, noxious or polluting materials in such low concentration that capture of the emitted substances for recycling is not economically feasible, or otherwise feasible. In order to provide non-polluting exhaust gases, however, thermal combustion is used to generate harmless exhaust gases which comprise carbon dioxide and water or water vapor. Temperatures in the order of between 600° and 800° are necessary to ensure complete conversion by reaction, and a minimum time in a reaction chamber of at least 0.6 second at the temperature. The time and temperature depend, among others, on the type and concentration of the polluting or noxious substances. This temperature range and minimum time is necessary if, further, the noxious copmponents which are to be oxidized are thoroughly mixed with the hot oxygen-rich combustion gases. Upon optimal adjustment of process parameter, a conversion degree of 99% and more can be reached, as explained in the article published in "Industrie Anzeiger" ("Industrial Gazette"), 102nd year, No. 8 of Jan. 30, 1980, article by T.H. Zimmer "Energiesparen durch thermische Nachverbrennung" ("Saving Energy by Thermal After-Burning").

An after-burner arrangement for an industrial furnace is described in the publication "Gaswärme International" ("Gas Heat International"), 33rd year, (1984), No. 9, article by H.B. Ricke "Thermische Nachverbrennung mit Erdgasbeheizung an Härteanlagen" ("Thermal After-Burning of Natural Gas Heated Hardening Plants").

This after-burner arrangement is coupled to a furnace chamber. In addition to heating the furnace chamber, an after-burner is installed in the after-burner chamber, and individual thereto. This arrangement uses preheating of raw gas by using the heat of the clean or pure gas from the after-burner chamber. This means that the raw gases are carried through the secondary side of a heat exchanger. The danger always exists that the narrow ducts of the heat exchanger can be plugged by deposits of polluting substances from the raw, impure gas, for example by soot or carbon particles therein. The energy which is released in the after-burner chamber upon combusting the raw gases is used only in part to preheat the raw gases. The remaining part is returned into the process chamber of the industrial furnace together with the clean gases. The furnace has a flue or outlet so that from the furnace clean gas as well as raw gas carrying polluting substances is emitted therefrom and can reach ambient space. Thus, the gases which are finally exhausted into the air are not completely free from polluting substances.

"Guideline 2442" of the German Engineering Society,

"VDI Richtlinie 2442" ("Society of German Engineers Guideline 2442"), Jun. 1987, article entitled "Abgasreinigung durch thermische Verbrennung" ("Exhaust Gas Cleaning by Thermal Combustion") requires utilization of the heat content in the clean gases if thermal after-burning is used, insofar as this can be carried out economically, for example by providing heat exchangers to preheat the raw or contaminated gases and/or combustion air for a burner if combustion air is supplied thereto. The purpose is energy conservation, that is, to decrease the requirement of additional after-burner energy.

THE INVENTION

It is an object to improve hot gas apparatus or processes which utilize a hot gas generation system by thermal after-burning, in which the heat energy balance is an optimum, which is simple, economical, and, in operation, provides non-polluting exhaust gases while being simple, in itself non-polluting, and protective of the environment.

Briefly, a combustion chamber, supplied with a flame jet, is subdivided into a hot gas generating chamber and an after-burning chamber; the flame jet extends into the hot gas generating chamber which has an outlet coupled directly to the processing chamber where heated air from the hot gas generating chamber can treat various workpieces or materials, to be then recycled through a hot gas circulating inlet back into the gas generating chamber, cooled by contact with the pollution-emitting materials in the processing chamber. In addition to the outlet to the processing chamber and the recirculating inlet, through which a closed loop of hot gas stream is passed, the combustion chamber is coupled to the after-burner chamber. The after-burner chamber does not contain a specific burner but is constructed in such a manner that it defines a volume therein which is enough to provide for dwell time of gases from the combustion chamber for complete oxidation or combustion of uncombusted or unoxidized matter in the raw or contaminated gas supplied thereto from the hot gas generating chamber. The outlet from the after-burner chamber is remote from the communication from the hot gas generating chamber to ensure this dwell time so that, at the outlet, non-polluting clean gas, that is, gas which does not contain any polluting, uncombusted, unoxidized matter, is emitted. A heat exchanger is coupled to receive the non-polluting gas from the exhaust gas outlet of the after-burner chamber. The secondary path of the heat exchanger heats air for removing heat from the nonpolluting gas and preheats air being supplied to the burner in the hot gas generating chamber. A sensor, typically a temperature sensor, senses the temperature of the raw gas, that is, the hot gas which includes, due to recirculation in the loop, polluting matter. The sensing elements controls control units responsive to the temperature to maintain a temperature of the raw gas which enters the after-burner chamber from the combustion chamber at a predetermined commanded level, and preferably in the range of between 600° to 900° C.; the exact temperature and the dwell time of the gases, including the quantity of excess oxygen in the after-burner chamber, will depend on the nature of the gases to be treated, and the nature of the polluting components picked up upon passage of the hot gases from the hot gas generating chamber in the closed loop.

In accordance with a feature of the invention, the thermal combustion is carried out in two stages-first, an incomplete stage in the hot gas generating chamber itself, and a second, completing stage in the after-burner chamber. The burner in the hot gas generating chamber is so constructed that it provides the necessary hot gases in accordance with the processes to be carried out in the processing chamber, that is, the heat requirements of the heat accepting structures in the processing chamber and simultaneously provides energy for carrying the gases in the closed loop through the processing chamber. The system has the advantage that additional burners in the after-burner chamber, as well as the associated control apparatus, power supplies, air supplies and the like are eliminated. Blowers and similar apparatus to circulate the hot gases, the raw or pollution-enriched gases and the clean gases usually are not required, but may be used.

The hot gas generating arrangement permits supply of a heat accepting structure with the necessary processing heat and, simultaneously, and without essential additional structural or capital requirements. The system can be used with already existing heat processing systems.

The hot gas generating arrangement and the entire system is not limited to use in industrial furnaces, for example continuous furnaces, individual batch treating furnaces, or retort furnaces. The present invention can be used in any arrangement or system in which, by thermal processes, combustible noxious materials arise in the exhaust gases occurring during the processes which, by thermal after-burning, must be rendered harmless before they can be exhausted into the atmosphere. Typical examples of such industrial plants are varnish and lacquer and painting booths and plants, dryers, roasting plants, plants and systems to remove oil from metal chips or the like, to burn out cores of molds in foundries, and other processes, for example as referred to above.

DRAWINGS (illustrating embodiments of the invention)

DETAILED DESCRIPTION

A processing chamber 1 retains therein workpieces W which are subjected to heat treatment and, upon being heated, emit polluting matter. The processing chamber 1 is well known and, as such, does not form part of the present invention, apart from being a component of the overall system. The system further includes a combustion chamber which, in accordance with a feature of the invention, is separated or divided into a hot gas generation chamber 2 and an afterburner chamber 3. The hot gas generation chamber 2 and the after-burner chamber 3 are in gas flow communication with each other, for example by a passage or outlet shown schematically in FIG. 1 at 4.

Figure 1:
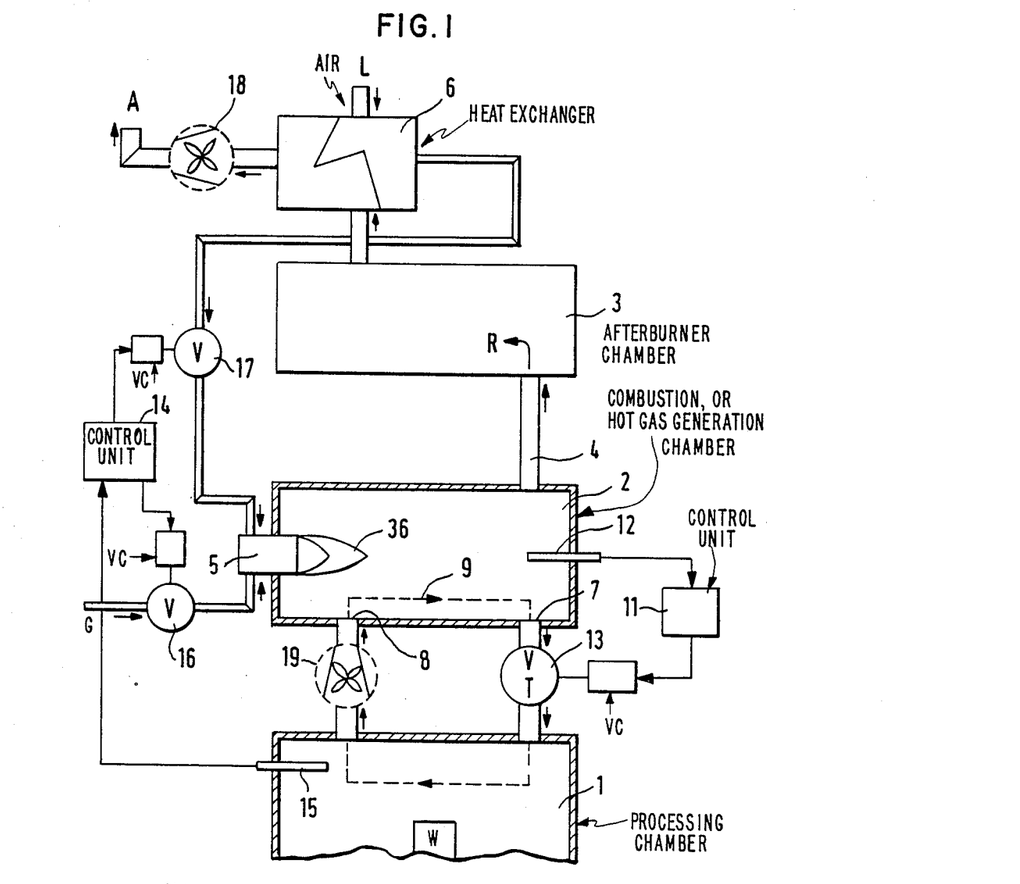
FIG. 1 is a schematic diagram of the system in accordance with the present invention, and illustrating the method of providing non-polluting exhaust gases from a thermal processing chamber which generates polluting gases.

The hot gas generating chamber 2 is directly heated by a burner unit 5. The hot gas generating chamber 2 communicates directly with the after-burner chamber 3 so that any incompletely burned fuel, together with polluting components, as will appear, and forming a raw gas R, can enter the after-burner chamber 3. A heat exchanger 6 is coupled to the after-burner chamber 3, which receives non-polluting gases in a primary gas flow circuit and receives, in a secondary gas flow circuit, heat exchange fluid in the form of fresh air through an inlet L. The fresh air is conducted to the burner 5 to preheat the combustion air therefor.

In accordance with a feature of the invention, a hot gas outlet 7 and a hot gas inlet 8 are formed in the hot air generating chamber 2 which, both, communicate with the processing chamber 1. Thus, for the hot gas, a closed circle or loop will be available, entering the processing chamber through the hot gas outlet 7 from the hot gas generating chamber 2, providing heat for heat treatment of the workpieces W and, in the process, becoming contaminated or enriched with polluting or contaminating substances. This gas is then recirculated through the inlet 8 from the processing chamber 1 into the hot gas generating chamber 2. The closed loop 9 is shown in broken lines in FIG. 1. The burner 5 is a jet burner and provides a flame jet or flame pulses which provides the energy to circulate a predetermined quantity of hot gases through the closed loop 9.

In accordance with a further feature of the invention, a control unit 11 is provided which maintains at least the temperature of the raw gases R at their entry into the after-burner chambers 3 at a predetermined command value. The control unit 11 responds to a temperature sensor 12. Temperature sensor 12 is located in the region of the communication arrangement 4 between the hot gas generation chamber 2 and the after-burner chamber 3. Control of the temperature of the gases which are passed in the after-burner chamber by the control unit 11 is indirect; the control unit 11 operates a valve 13, shown schematically in FIG. 1 as a throttle or choke, to thereby control the throughput of hot gases in the closed loop 9.

The burner 5 is supplied with fuel, preferably gas from a gas inlet G and with the preheated air from the heat exchanger 6. A burner control unit 14 responds to a temperature sensor 15, located in the processing chamber 1. In accordance with the temperature sensed by sensor 15, the control unit 14 operates respective valves 16 and 17 for, selectively, controlling fuel and air flow to the burner 5. Suitable valve controls VC, shown only schematically, are interposed between the control units 11, 14 and the respective valves to provide operating power. Such valve control units are standard articles of commerce. By controlling flow of fuel and air to the burner 5, the temperature in the hot gas generating chamber 2 is controlled, and by controlling the extent of flow of hot gas through the loop 9, the temperature of the gases in the hot gas generator chamber 2, as well as the gases then passed into the after-burner chamber 3 are controlled.

If desired, a blower 18, and shown in broken lines, is coupled to the primary ducting of the heat exchanger 6 in order to suck out pure, non-polluting gas from the heat exchanger 6 for exhaustion into the atmosphere. Such non-polluting gas is shown schematically at arrow A. A blower or fan unit 19 may also be interposed in the loop 9, connected for example as shown between the processing chamber and the inlet 8 to the hot gas generating chamber. Usually, the blower 19 is not needed, and is used only if the flow conditions in the processing chamber and/or the hot gas generating chamber are unsatisfactory - which may occur in retrofitted old installations - and assists the hot gas flow in the loop 9.

Figure 2:
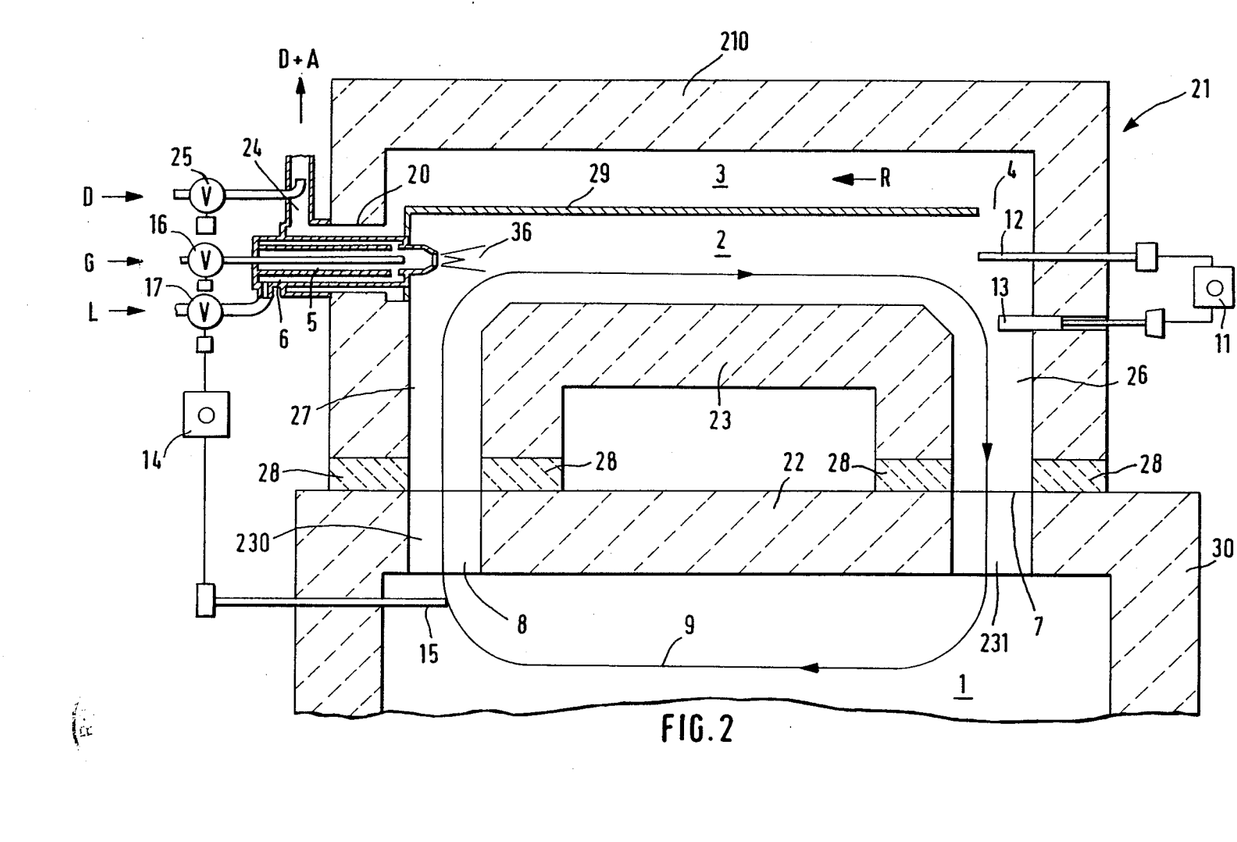
FIG. 2 is a part-schematic, part-longitudinal cross-sectional view through a hot gas generating plant with thermal after-burning, and utilizing the principle of the invention in accordance with FIG. 1.

FIG. 2 illustrates a practical example of the system illustrated in connection with the schematic illustration of FIG. 1. The after-burner chamber 3 and the hot gas generating chamber 2 are combined into a single structural unit 21 which is fitted on a wall 22, defining the upper wall of the processing chamber 1. The processing chamber 1 may be part of a standard industrial furnace. It is shown only schematically, and usually is an elongated box-shaped structure which is internally lined with fire-brick or similar material. The unit 21, likewise, is an elongated structure having an essentially, in cross section, rectangular housing 210 of heat-resistant material. A structural element 23, essentially in form of an inverted, in cross section essentially U-shaped bridge 23, is located within the housing 210. The structural element 23, together with the inner walls of the up-standing portions of the element 210 defines two ducts 26, 27 for the closed loop path of the hot gases. The first duct 26 terminates in the hot gas outlet 7; the second duct 26 forms the hot gas inlet 8. A heat-resistant sealing structure 28, formed with openings matching openings 230, 231 in the top wall of the industrial furnace housing 30, provides for completion of the loop path.

The hot gas generating chamber 2 is separated from the after-burner chamber 3 by a metallic separating wall 29, made of highly heat resistant metal. The separating wall 29 does not extend all the way across the inner portion of the structure 210 but, rather, leaves open a gap to form the communication opening 4 between the chambers 2 and 3. The communication gap 4 permits passage of raw gas R, to be burned in after-burner chamber 3 from the hot gas generating chamber 2. The after-burner chamber 3 is elongated and, opposite the gap 4, is formed with an exit opening 20 which at the same time forms part of the heat exchanger 6, as will appear from the description below.

The burner 5, in accordance with a preferred embodiment of the invention, is a recuperator burner which extends through the end wall of the structure 210 into the hot gas generating chamber 2. A recuperating burner has an outer rib-shaped structure which forms the heat exchanger; this outer rib-shaped structure is in flow communication with the after-burned gases A from the after-burner chamber 3. Control valves 16, 17 can control the admission of air and fuel to the burner 5. The control unit 14 senses the temperature of the gases being recirculated in the loop 9, as communicated thereto by the temperature sensor 15. Temperature sensor 15 is located in the region of the recirculating gas inlet 8 to the hot gas generating chamber 2. The preheated supply air L is carried through the secondary portion of the heat exchanger 6 which, at the primary side, receives the hot purified, after-burned gas A from the after-burner chamber 3.

The fuel, typically gas G, is burned with the preheated supply air L in the hot gas generating chamber 2, which, thereby, is directly heated. The recuperator burner of the burner unit 5 extends with its forward end into the hot gas generating chamber 2, and has a flame jet 36, for example providing a jet pulse. This pulse ensures good mixing of the gases in the hot gas generating chamber 2. An eductor 24 is located at the outlet from the primary heat exchange path of the heat exchanger 6. Eductors, as well known, operate on the principle of an air jet pump, and are supplied by compressed air, shown schematically by the inlet D. Admission of compressed air is controlled by valve 25 which, in turn, is controlled by a suitable control unit 25'.

Recuperator burners like burner 5 are well known and described, for example, in detail in German Patent 34 22 229.

Figure 3:
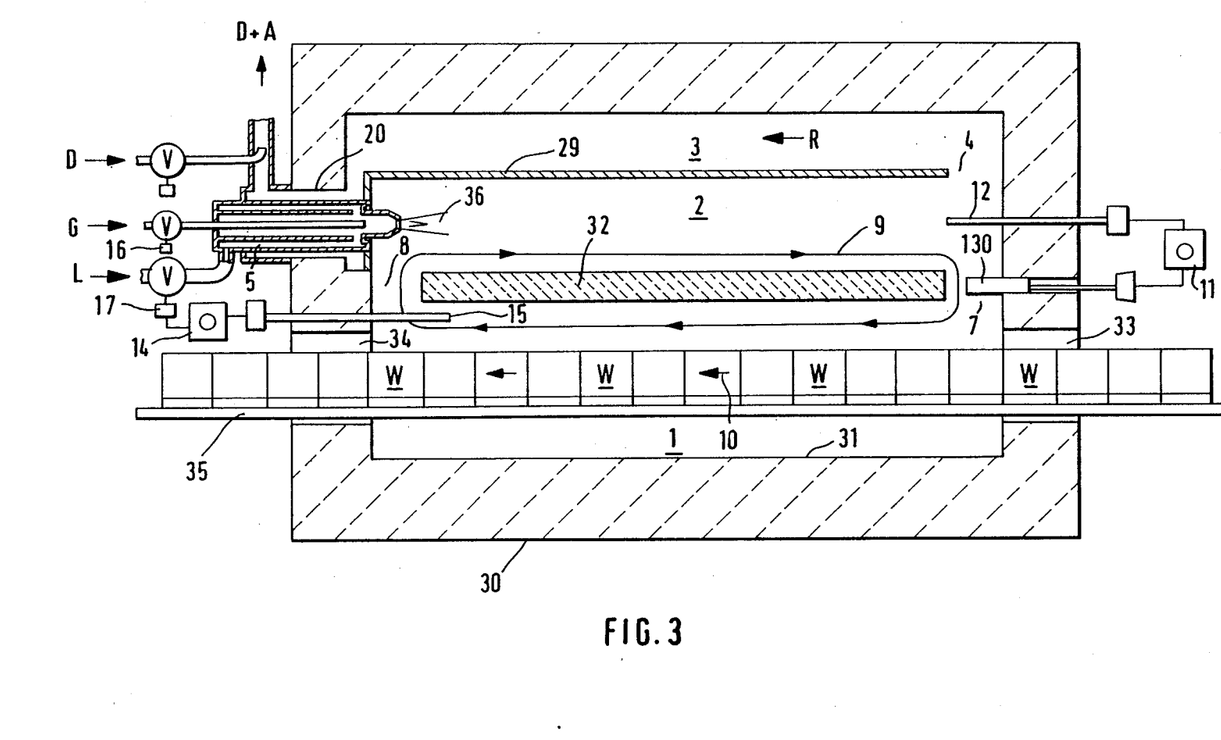
FIG. 3 is a longitudinal schematic cross-sectional view through an industrial furnace in integrated construction, equipped and arranged in accordance with the system shown in FIG. 1.

FIG. 3 is a schematic representation of an industrial furnace, formed as a continuous treatment furnace and fitted with the pollution control system in accordance with the present invention. The system is integrated with the industrial furnace. Similar elements previously described have been given the same reference numerals and will not be described again.

The industrial furnace has a longitudinal housing 30, in the interior of which the processing chamber 1 is formed. The hot gas generator chamber 2 and the after-burner chamber 3 are likewise shown.

The processing chamber 1 is separated from the hot gas generator chamber 2 by a separating wall 32 of fire-brick or the like. The separating wall 32 does not extend clear to the ends of the elongated furnace but, rather, leaves open the hot gas outlet 7 from the hot gas generator chamber 2 and the recirculating inlet 8. The recuperator burner 5 is located within the opening 20 in one end wall of the furnace, see FIG. 3. The recirculating inlet 8 is located adjacent the wall in which the burner 5 is located, in FIG. 3 at the left; the hot gas outlet, to provide the treatment gases to the processing chamber 1 is located remote from the burner, adjacent the opposite end wall. Openings 34 are provided in the furnace 1 to permit workpieces W to be carried through the processing chamber in the direction of the arrows 26, from the right towards the left.

The temperature of the hot gases as well as the temperature of the raw gases R entering the after-burner chamber 3 is controlled by the control unit 11, which responds to the temperature sensor 12 located in the region of the hot gas outlet 7. A slider 130 forms a control element to control the clear opening of the hot gas outlet 7 and thus the throughput of hot gases in the loop 9. Rather than using a slider 130, other control units may be used, for example a throttle valve, a flap valve, or the like. All other elements are similar to those described in connection with FIGS. 1 and 2.

OPERATION

Hot gases G and combustion air L are supplied to the recuperator burner of the burner unit 5, which operates in controlled ON/OFF operation. More than one burner element 5 may be used, as required by the size of the apparatus. The burner or the respective burner units which eject a flame 36 into the hot gas generator 2 generate a strong combustion or burner pulse. The flame gases from the burner have an exit speed of about 100 meters per second. They form a flame jet, shown schematically at 36, which extends parallel to the upper and lower wall of the elongated hot gas generator chamber 2. The flame jet 36 provides the necessary energy for the circulation of the hot gases in the circulating loop 9. As the hot gases impinge on the workpieces W in the processing chamber, the workpieces W will be heated and the hot gases will be correspondingly cooled. The hot gases, which also accept polluting matter, are recirculated into the hot gas generating chamber 2 and will form a raw gas R therein. This raw gas R is a composite of the hot combustion gases ejected from the burner orifice of the burner unit 5 and the recirculated gases from the processing chamber 1, which may include polluting substances or matter.

Typical goods forming the workpieces W may be goods which have oil or other lubricants thereon. Upon hot gas treatment, and particularly in processing temperatures of between 100° C. to 700° C. within the processing chamber 1, gases which include not completely oxidized hydrocarbon compounds, or vapors thereof, will be carried along with the hot gases being recirculated in the loop 9 in the hot gas generating chamber 2, to form polluting substances therewith.

A portion of the polluting substances is already burned in the hot gas generating chamber 2 since the temperatures, dwell times and the like provide desirable conditions for oxidation of polluting compounds. Usually, however, the conditions for complete oxidation of polluting compounds are such that they do not suffice to completely oxidize polluting components from the processing chamber 1. The raw gas R from the hot gas generating chamber 2 and which flows through the gap 4 into the after-burner chamber 3 will be a portion of the combustion gases including some of the unburned components from the recirculating loop 9. The conditions within the after-burner chamber 3 are such that any previously non-burned components in the raw gas R are completely after-burned so that the gases which reach the heat exchanger 6 are, effectively, completely non-polluting, cleaned gas which, as shown in FIGS. 2 and 3, are then used to preheat the combustion air for the recuperator burner or burners 5.

Governmental and industry standards require that the exhaust gas A finally emitted into the atmosphere has a high degree of purity. To maintain the purity of the exhaust gases and hold any polluting substances within the extremely low limits as required by governmental and other regulations, the raw gas which enters the recuperating chamber must be so treated that effectively all contaminating substances are completely oxidized. The following operating parameters, thus, are usually required for the operating conditions of the gases within the after-burner chamber 3:

| | |
|---|---|
| reaction temperature | 700° C. to 900° C. |
| excess oxygen | 5 to 10% by volume |
| dwell time | 1 to 2 seconds, with good intermixing. |

To maintain these conditions, it is necessary to maintain the inlet to the after-burner chamber 3 in the region of the gap 4 for the raw gas at a temperature of at least about 800° C. The effective volume of the after-burner chamber 3 is then so selected that the throughput of the burner 5 results in a gas generation of such quantity that the necessary dwell time of gases flowing through the after-burner chamber is ensured.

The quantity of hot gases circulated in the loop 9 depends on the heat consumption of the workpieces W being treated in the processing chamber 1. This heat consumption can be measured by measuring the temperature by sensor 7 at the inlet to the processing chamber and sensor 15 at the outlet therefrom and determining the temperature difference between the admitted hot gases in the processing chamber and the recirculated gases therefrom. The hot gas chamber outlet temperature, measured in the region of the hot gas chamber outlet 7 by the temperature sensor 15, may be, for example, about 800° C. The recirculated hot gases, measured by the temperature sensor 15 in the region of the recirculating inlet 8, may be at about 600° C., so that the temperature difference will be about 200° C. The temperature of the gases emitted from the burner 5 may be in the order of about 2000° C. For such conditions, the loop 9 must circulate hot gases in a quantity which is about 10 times that of the gas flow of raw gas R which enters the after-burner chamber 3.

By adjustment of the valve, throttle or slider 13, 130, respectively, the quantity of the hot gases circulated in the loop 9 is controlled. This control, then, also influences the mixing temperature of the raw gases R in the hot gas generation chamber 2. The control unit 11, by suitable operation of the valve 13 - or slider 130, respectively -will maintain the temperature sensed by the temperature sensor 12 at a predetermined command value. At the same time, the controller 14 controls the energy supply to the recuperator burner of the burner unit 5 in dependence on the temperature measured by the temperature sensor 15 at the outlet of the processing chamber or, respectively, the recirculating inlet 8 of the hot gas generating chamber, so that the processing chamber temperature will be maintained at a predetermined command value.

Various changes and modifications may be made. In the embodiments described, the choke, throttle or slider 13, 130 is located in the region of the hot gas outlet 7 from the hot gas generating chamber 2 into the processing chamber 1. Under some conditions, it may be preferred to place the throttling or control element immediately at the communicating outlet from the hot gas generating chamber 2 or immediately in the region of the inlet to the processing chamber 1. Also, the gas flow can be controlled by placing valves, throttles or sliders in the recirculating inlet 8, or adjacent the respective openings in the processing chamber 1 or the hot gas generation chamber 2. The various positions on which the temperature sensors 12, 15 are placed to monitor the temperature in the respective chambers 1, 2 can be changed, in dependence on the respective selected embodiment and as convenient, for example, for structural reasons.

The burner unit 5, in dependence on the required heat output and the construction of the industrial furnace or other furnace unit can be suitably selected and, if necessary, a plurality of burner elements may be used.

The system can be used with various types of furnaces, for example for continuous processing, as shown in FIG. 3, for batch processing, in retort furnaces or the like; it may be used, in general, in all instances where thermal processes liberate combustible noxious or polluting components which, then, occur in an exhaust gas, and which can be rendered harmless by after-burning. The system, thus, is equally applicable to painting, lacquering, varnishing and drying plants, for metal roasting, systems and plants to remove oil from workpieces, cutting chips or the like, or to burn out pattern cores in foundries.

Figure 1A:
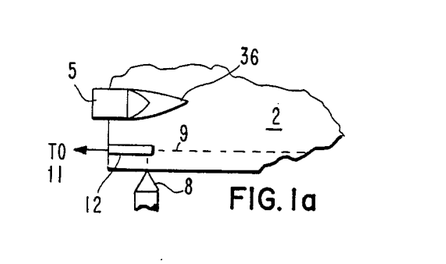
FIG. 1a is a fragmentary view of the system of FIG. 1 and illustrating another location for a temperature sensor.
Figure 2A:
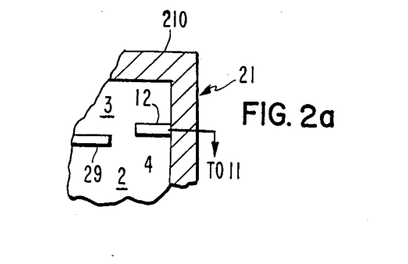
FIG. 2a is a fragmentary view of FIG. 2 and illustrating yet another position for the temperature sensor.

Features described in connection with any one of the embodiments may be used with any of the others, within the scope of the inventive concept. For example, the temperature sensor 12 can be located as shown in FIGS. 1-3 in the region of the communication outlet 7 or the communication duct 26 from the hot gas generating chamber 2 into the processing chamber 1; it can also be located in the region of the recirculating inlet 8 from the processing chamber 1 into the hot gas generating chamber, as shown in FIG. 1a; or it can be located, as shown in FIG. 2a, in the region of the communication gap or duct 4 between the hot gas generating chamber 2 and the after-burner chamber 3; several sensors, located at respectively different positions as shown in the various figures may be used, to provide a composite temperature profile of the conditions within the system to the control unit 11.

I claim:

1. Non-environmentally polluting hot gas generating system, emitting clean, non-polluting exhaust gases, comprising
    a hot gas generating chamber (2) and an after-burner chamber (3) forming, together, a combustion chamber;
    a burner means (5) emitting a fuel jet (36) located in said hot gas generating chamber and ejecting a flame jet into the chamber in a predetermined direction;
    a processing chamber (1) for carrying out thermal treatment of processes during which polluting matter including at least one of: combustible or oxidizable gases, combustible or oxidizable vapors, or combustible or oxidizable particles are liberated;
    a hot gas outlet (7) from the gas generating chamber (2) and coupled to the processing chamber (1) to provide hot gases therefor,
    said hot gases being cooled while carrying out said thermal treatment and liberating polluting matter;
    a hot gas recirculating inlet (8) into the gas generating chamber and coupled to the processing chamber to receive said cooled hot gases, together with liberated polluting matter, said cooled hot gases together with the liberated polluting matter and the hot gases generated by the burner mixing in a hot gas generating chamber (2) and forming a raw gas (R),
    a portion of said hot gas generating chamber, said hot gas outlet (7), a portion of the processing chamber (1) and the recirculating inlet into the hot gas generating chamber forming a closed gas cycling loop (9) in which a predetermined quantity of gases circulates;
    burner control means (14) controlling fuel supply to the burner to furnish said hot gases for said thermal treatment and energizing the gases in the hot gas generating chamber for circulation in said gas circulating loop (9);
    said after-burner chamber (3) communicating with the hot gas generating chamber (2),
    said after-burner chamber (3) defining a volume which is large enough to provide for a dwell time in said afterburner chamber of the raw gas supplied thereto from the hot gas generating chamber (2) to completely burn or oxidize said polluting matter to result in a non-polluting gas (A);
    a heat exchanger (6) coupled to receive the nonpolluting gas (A) from said after-burner chamber, said heat exchanger having an air heat exchange inlet (L) for admitting ambient air and heating said ambient air by removing heat from the non-polluting gases and said air thereby becoming preheated;
    means (17) for coupling the preheated air from the heat exchanger to the burner means (5) to thereby supply preheated combustion air thereto;
    sensing means (12) sensing at least the temperature of the raw gases (R) in the combustion chamber (2); and
    control means (11, 13) responsive to the sensed temperature of the raw gases (R) and maintaining the temperature of the raw gases (R) entering the afterburner chamber (3) from the combustion chamber (2) at a predetermined command level which is sufficiently high to effect complete combustion of the raw gases (R) and result in said non-polluting gas (A).

2. The system of claim 1, wherein the hot gas generating chamber (2) and the after-burner chamber (3) comprise a single structural unit (21),
    said single structural unit being coupled to the processing chamber (1) and attachable therewith;
    said single structural unit having elongated form to define elongated hot gas generating and after-burning chambers, the burner means being located adjacent one end portion of the elongated hot gas generating chamber;
    the hot gas outlet from the hot gas generating chamber (2) being positioned at a side opposite the side at which the burner means is located; and
    the hot gas recirculating inlet (8) being located in the vicinity of the side in which the burner means is positioned.

3. The system of claim 2, wherein said single structural unit includes an elongated housing structure (210);
    a separating insert (23) extending along the longitudinal extent of the elongated housing structure and separating said elongated housing structure to form said hot gas generating chamber (2) and said afterburner chamber (3), said separating insert terminating at least in part short of the inner walls of the elongated housing structure and defining, with the inner walls of the elongated housing structure, a first duct (27) and a second duct (28);
    said single structural unit being formed with openings communicating with the processing chamber (1) to form said hot gas outlet (7) and said hot gas recirculating inlet (8), said ducts being coupled to and in gas communication with said hot gas outlet and hot gas recirculating inlet.

4. The system of claim 1, wherein said combustion chamber forms a single structural unit;

a heat-resistant separating wall (29) extending from a side wall of said single structural unit into said single structural unit to separate said single structural unit, internally, into two chambers, one of said chambers forming the hot gas generating chamber (2) and the other of said chambers forming the after-burner chamber (3);

and a gas passage opening (4) to permit passage of gases through or around said separating wall (29) and provide for communication of raw gas (R) from the hot gas generating chamber (2) into the after-burner chamber (3).

5. The system of claim 4, wherein said opening is formed by a gap between the separating wall (29) and an inner wall of the single structural unit.

6. The system of claim 2, wherein said single structural unit comprises an elongated housing structure;

a separating wall (29) of heat-resistant material extending from the region of the burner means (5) to an opposite wall, leaving a gap from the inner wall portion of said opposite wall to form a gas communication duct to permit passage of the raw gas (R) from the hot gas generating chamber to the after-burner chamber.

7. The system of claim 6, wherein the separating wall comprises a high-temperature-resistant metal.

8. The system of claim 1, wherein the hot gas generating chamber (2), the after-burner chamber (3) and the processing chamber (1) form at least part of an elongated industrial furnace;

a separating element (32) separating the hot gas generating chamber (2) from the processing chamber (1), said separating element and inner wall portions of the industrial furnace defining two openings or gaps which, respectively, form said hot gas outlet (7) and said hot gas recirculating inlet (8); and the burner means (5) being located in a side wall of said elongated industrial furnace in the region of the hot gas recirculating inlet, the hot gas outlet (7) being located in the region remote from said burner means to provide for circulation of hot gases in said closed gas circulating loop (9).

9. The system of claim 8, wherein the separating wall comprises a high-temperature-resistant metal.

10. The system of claim 1, wherein the burner means (5) and the heat exchanger (6) comprise at least one recuperator burner unit.

11. The system of claim 1, wherein the sensing means comprise a temperature sensing element (12) located in the region of the hot gas outlet (7).

12. The system of claim 1, wherein the sensing means comprise a temperature sensing element (12) located in the region of the recirculating gas inlet (8).

13. The system of claim 1, wherein the sensing means comprise a temperature sensing element (12) located in the region of gas communication of the hot gas generating chamber (2) with the after-burner chamber (3).

14. The system of claim 1, wherein the control means includes valve or choke or throttle means (13, 130) interposed in the path of the gases in said loop (9) to control the throughput of gas flow in said loop.

15. The system of claim 1, further including forced circulation means (19) located in the path of gas flow of gases in said closed loop.

16. The system of claim 1, further including suction means (18; 24, 25) coupled to receive the clean gases (A) from the after-burner chamber and remove the clean gases therefrom.

17. The method of generating hot gases for heat treating workpieces (W) by the hot gases which, when exposed to the hot gases emit oxidizable or combustible polluting matter, while emitting clean non-polluting exhaust gases, comprising the steps of generating, in an elongated hot gas generating chamber (2), hot gases by injecting a flame jet (36) from one end portion of the elongated chamber thereinto;

coupling the thus generated hot gases through a hot gas outlet into a processing chamber (1) in which the workpieces (W) are located, at a region remote from the origin of said flame jet;

controlling said injected flame jet to provide said hot gases for said thermal treatment and imparting sufficient energy from said flame jet (36) to the hot gases to effect circulation of a portion of the hot gases in a closed loop (9), which closed loop extends from the hot gas generating chamber (2) into and through the processing chamber (1) and back through a recirculating inlet (8) into the hot gas generating chamber (2), whereby said hot gases will heat-treat said workpieces (W) in the processing chamber, be cooled, will receive polluting matter including at least one of: combustible or oxidizable gases, 18. The method of claim 17, wherein said step of controlling the temperature and dwell time of the gases in the after-burner chamber for complete oxidation or combustion of the gases therein comprises controlling the supply of fuel to form said flame jet and controlling the quantity of gases being passed through said closed loop.

19. The method of claim 17, wherein said step of controlling the temperature and dwell time of the gases in said after-burner chamber comprises measuring the temperature of gases in at least one of: said control loop; gas flow between the hot gas generating chamber (2) and the after-burner chamber (3), and controlling at least one of: fuel supply to the flame jet (36); throughput of gases in said closed loop (9) as a function of sensed temperature.

20. The method of claim 19, wherein said step of controlling throughput of gas flow in said closed loop comprises throttling flow of gases between the hot gas generating chamber (2) and the processing chamber (1).

21. The method of claim 17, wherein said step of controlling the temperature and dwell time of the gases in said after-burner chamber comprises measuring the temperature of gases in at least one of: said closed loop; gas flow between the hot gas generating chamber (2) and the after-burner chamber (3); and controlling the fuel supply to the flame jet (36) and throughput of gases in said closed loop (9) as a function of at least one of said sensed temperatures.

22. The system of claim 1, wherein the burner control means comprises means (14, 16) for controlling the supply of combustible fuel (G) to said burner means (5);

said control means (11, 13) include means (13) for controlling flow of hot gases in said closed gas cycling loop (9) to thereby maintain the temperature of the raw gases (R) enerting the after-burner chamber (3) at a predetermined command level; and wherein the burner means (5) and the heat exchanger (6) comprise at least one recuperator burner unit.

23. The system of claim 1, wherein the burner control means comprises means (14, 16) for controlling the supply of combustible fuel (G) to said burner means (5) as a function of heat requirement in said processing chamber; and said control means (11, 13) include means (13) for controlling flow of hot gases in said closed gas cycling loop (9) to thereby maintain the temperature of the raw gases (R) entering the after-burner chamber (3) at a predetermined command level.

24. The system of claim 23, the means for controlling flow of hot gases in said loop (9) includes valve or choke or throttle means (13, 130) interposed in the path of the gases in said loop (9) to control the throughput of gas flow in said loop. combustible or oxidizable vapors, or combustible or oxidizable particles by liberation during said heat treating, and will be recirculated back through the recirculating inlet (8) into the hot gas generating chamber (2);

mixing said cooled hot gases together with the liberated polluting, and the hot gases generated by the burner in said hot gas generating chamber, and forming a raw gas (R) therein;

passing a portion of the raw gases (R) from the hot gas generating chamber into an after-burner chamber (3);

sensing the temperature at least of the raw gases (R) in the combustion chamber (2);

controlling the flow of gases through said afterburner chamber and maintaining the temperature in said afterburner chamber such that the temperature and dwell time of the raw gases (R) entering the afterburner chamber will be at a predetermined command level which is sufficiently high to completely burn or oxidize any unoxidized or unburned matter or components of the raw gases (R) therein to result in a clean, non-polluting exhaust gas (A);

passing the clean, non-polluting exhaust gases through a heat exchanger in a primary gas flow; and preheating air being supplied to said flame jet in a secondary gas flow and recuperating heat from said non-polluting clean gas (A) in the heat exchanger (6).

* * * * *